(12) United States Patent
Takeuchi et al.

(10) Patent No.: US 8,503,295 B2
(45) Date of Patent: Aug. 6, 2013

(54) BASE STATION AND ACCESS CONTROL METHOD FOR CELLULAR WIRELESS COMMUNICATION

(75) Inventors: Keisuke Takeuchi, Yokohama (JP); Rintaro Katayama, Tachikawa (JP); Tomonori Yamamoto, Kokubunji (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 767 days.

(21) Appl. No.: 12/641,366

(22) Filed: Dec. 18, 2009

(65) Prior Publication Data

US 2010/0157831 A1 Jun. 24, 2010

(30) Foreign Application Priority Data

Dec. 22, 2008 (JP) ................................. 2008-325984

(51) Int. Cl.
*H04J 3/16* (2006.01)
(52) U.S. Cl.
USPC ............................ 370/230; 370/252; 370/329
(58) Field of Classification Search
USPC ......................................... 370/230, 252, 329
See application file for complete search history.

(56) References Cited

U.S. PATENT DOCUMENTS

| | | | |
|---|---|---|---|
| 5,748,624 | A | 5/1998 | Kondo |
| 7,089,017 | B2 | 8/2006 | Chen et al. |
| 7,269,423 | B2 | 9/2007 | Lee et al. |
| 7,912,472 | B2 | 3/2011 | Beziot et al. |
| 7,978,724 | B1 * | 7/2011 | Mansour et al. ............... 370/436 |
| 8,036,136 | B1 * | 10/2011 | Mansour et al. ............... 370/252 |
| 2002/0123314 | A1 | 9/2002 | Kitazawa et al. |
| 2005/0159166 | A1 * | 7/2005 | Jonsson et al. ............. 455/452.2 |
| 2005/0180354 | A1 * | 8/2005 | Cho et al. ....................... 370/328 |
| 2006/0159016 | A1 * | 7/2006 | Sagfors et al. ................. 370/230 |
| 2009/0201875 | A1 * | 8/2009 | Hasegawa et al. ............. 370/329 |

FOREIGN PATENT DOCUMENTS

| | | |
|---|---|---|
| JP | 5-347783 A | 12/1993 |
| JP | 07-099526 A | 4/1995 |
| JP | 08-204673 A | 8/1996 |
| JP | 2000-068969 A | 3/2000 |
| JP | 2002-044719 A | 2/2002 |
| JP | 2002-204481 A | 7/2002 |
| JP | 2003-179966 A | 6/2003 |
| JP | 2003-264878 A | 9/2003 |
| JP | 2004-228905 A | 8/2004 |
| JP | 2005-086479 A | 3/2005 |
| JP | 2008-514074 A | 5/2008 |

* cited by examiner

*Primary Examiner* — Jason Mattis
(74) *Attorney, Agent, or Firm* — Mattingly & Malur, PC

(57) ABSTRACT

A base station is connected to wired and wireless networks to send a call that is received from the wired network to the wireless network at a predetermined quality of service (QoS), select one or more combinations of a set of modulation and coding scheme, and a radio resource amount that are associated with a QoS set in a newly incoming call, determine the radio resource amount that is equal to or less than a amount of the unassigned radio resources, assign, to the newly incoming call, the combination that is associated with the determined radio resource amount and the QoS set in the newly incoming call, reduce the radio resources assigned to the ongoing call without changing the QoS, and assign, to the newly incoming call, an amount of radio resources released from the ongoing call and modulation and coding scheme associated with this released radio resource amount.

6 Claims, 16 Drawing Sheets

733

| RB \ MOBILE TERMINAL | 1 | 2 | 3 | 4 | ...... |
|---|---|---|---|---|---|
| 1 | 6 | 1 | 8 | 1 | |
| 2 | 8 | 2 | 9 | 1 | |
| 3 | 10 | 4 | 9 | 2 | |
| 4 | 9 | 4 | 7 | 3 | |
| ⋮ | | | | | |
| 50 | 5 | 12 | 4 | 5 | |

| RB \ INTERLACE | 1 | 2 | 3 | ...... | 8 |
|---|---|---|---|---|---|
| 1 | 1 | | 11 | | 4 |
| 2 | 1 | | | | 4 |
| 3 | 1 | 3 | | | |
| 4 | 2 | 3 | 12 | | |
| ⋮ | | | | | |
| 50 | 10 | | 5 | | 15 |

*Fig.9*

| QOS CLASS | 1 | | 2 | | ········ | M | |
|---|---|---|---|---|---|---|---|
| PACKET SIZE | 3112 | | 6712 | | | 26416 | |
| ASSIGNMENT PATTERN INDEX | MCS INDEX | NUMBER OF RB | MCS INDEX | NUMBER OF RB | | MCS INDEX | NUMBER OF RB |
| 1 | 6 | 30 | 7 | 55 | | 15 | 92 |
| 2 | 7 | 25 | 8 | 48 | | 16 | 85 |
| ⋮ | | | | | | | |
| N | 27 | 5 | 28 | 10 | | 28 | 40 |

*Fig.11*

| TRAFFIC INDEX | DOWNLINK | | | UPLINK | | |
|---|---|---|---|---|---|---|
| | QOS CLASS | ASSIGNMENT PATTERN INDEX | RESOURCE COMPRESSION FLAG | QOS CLASS | ASSIGNMENT PATTERN INDEX | RESOURCE COMPRESSION FLAG |
| 1 | 2 | 5 | 1 | 2 | 5 | 1 |
| 2 | 8 | 1 | 0 | 1 | 10 | 1 |
| 3 | 3 | 4 | 0 | 3 | 6 | 1 |
| 4 | 10 | 7 | 1 | 10 | 3 | 0 |
| ⋮ | | | | | | |

*Fig.12*

| TRAFFIC INDEX | DOWNLINK | | | | UPLINK | | | |
|---|---|---|---|---|---|---|---|---|
| | QOS CLASS | ASSIGNMENT PATTERN INDEX | PRIORITY FOR KEEPING ASSIGNED RESOURCE | RESOURCE COMPRESSION FLAG | QOS CLASS | ASSIGNMENT PATTERN INDEX | PRIORITY FOR KEEPING ASSIGNED RESOURCE | RESOURCE COMPRESSION FLAG |
| 1 | 2 | 5 | 1 | 1 | 2 | 5 | 1 | 1 |
| 2 | 8 | 1 | 4 | 0 | 1 | 10 | 4 | 0 |
| 3 | 3 | 4 | 3 | 0 | 3 | 6 | 3 | 0 |
| 4 | 10 | 7 | 2 | 1 | 10 | 3 | 3 | 0 |
| ...... | | | | | | | | |

BASE STATION AND ACCESS CONTROL METHOD FOR CELLULAR WIRELESS COMMUNICATION

CLAIM OF PRIORITY

The present application claims priority from Japanese patent application JP 2008-325984 filed on Dec. 22, 2008, the content of which is hereby incorporated by reference into this application.

BACKGROUND OF THE INVENTION

This invention relates to a base station, and more particularly, to a base station capable of access control in wireless communication.

Research and development is being conducted on wireless communication systems that employ orthogonal frequency division multiplexing (OFDM) for the purpose of increasing the speed and capacity of wireless communication. In OFDM, information is transmitted on a plurality of subcarriers that are different from one another in frequency and orthogonal to one another. A transmitter that uses OFDM to send a signal generates data to be sent in the frequency domain, converts the generated data into a time domain signal through inverse fast Fourier transform (IFFT), and sends the converted data as a radio signal. A receiver that uses OFDM to receive a signal obtains the original data by converting the received radio signal of the time domain into a frequency domain signal through fast Fourier transform (FFT).

In orthogonal frequency division multiple access (OFDMA), each subcarrier is assigned to a plurality of terminals and multiple access is implemented by multiplexing through OFDM.

Standards for cellular wireless communication systems that use OFDMA include Long Term Evolution (LTE) and Ultra Mobile Broadband (UMB). In these standards, uplink data transmission and downlink data transmission are separately assigned radio resources in units of a predetermined number of subcarriers for each predetermined time section.

The LTE or UMB standard uses adaptive modulation. In adaptive modulation, several different Modulation and Coding Schemes (MCSs) telling which modulation scheme and what coding rate for error correcting coding are to be used for packet transmission are defined, and one optimum for the channel state is selected out of the defined schemes. Deciding on an MCS is also a function of the base station.

The core network of a cellular wireless communication system is at present divided into a circuit switching network for voice communication and a packet switching network for data communication, which are likely to be integrated into a single packet switching network by introducing Voice over IP (VoIP), where voice signals are turned into IP packets. In the event of integration of separate networks that constitute a core network into one, it needs to be guaranteed that a delay in the transmission of a voice IP packet does not exceed a certain amount in order to ensure a satisfactory communication quality. Future wireless communication systems are also expected to act as a means to deliver various other services than voice communication where the quality of service (QoS) in terms of transmission delay and data transmission rate needs to be guaranteed.

SUMMARY OF THE INVENTION

A first problem to be solved by this invention is wireless link control for guaranteeing QoS in OFDMA.

In Evolution Data Optimized (EV-DO), which is a standard for cellular wireless communication systems that use code division multiple access (CDMA), data traffic is classified into one that is required to reduce delay and one that is not, and control is performed to increase the transmission power for the former data traffic required to be small in delay amount, and hence the transmission is completed early. QoS guarantee is thus accomplished.

However, applying the control method that is used in EV-DO to an OFDMA-based system is difficult because, in a system that uses OFDMA, increasing the transmission power gives rise to the problem of interference with other cells.

A second problem to be solved is how a new call of which QoS needs to be guaranteed should be processed in congestion or in a situation close to congestion.

In a conventional method, the base station refuses to accept a new call when the amount of available radio resources is smaller than an amount necessary to guarantee the QoS of the new call (see JP 2002-204481 A, for example).

In another conventional method, the base station terminates an existing call to accept a new call when the new call has a priority higher than that of the existing call (see JP 2004-228905 A, for example).

A drawback of the abovementioned two methods is that either a new call or an existing call is blocked.

There is an alternative method in which the base station lowers the data transmission rate of an existing call to ensure radio resources in an amount necessary to accept a new call (see JP 05-347783 A, for example).

This method, which changes the data transmission rate of an existing call, may reduce the blocking rate of new calls and existing calls but lowers the QoS of the existing call. Furthermore, changing the data transmission rate requires resetting the existing call in an upper layer, and the resetting may increase a processing delay.

This invention provides a cellular wireless communication system using OFDMA that is capable of guaranteeing QoS.

A representative aspect of this invention is as follows. That is, there is provided a base station connected to a wired network and a wireless network to set up a call between the wired network and the wireless network at a predetermined quality of service, comprising a connection control unit, a quality of service information holding unit and a radio resource management unit. The quality of service information holding unit holds a combination of the quality of service, sets of modulation and coding schemes, and a radio resource amount, and holds association information associating the combination with an ongoing call that is in communication. The radio resource management unit holds information about radio resources that are assigned to the ongoing call and radio resources that are not assigned to the ongoing call, and calculates an amount of the unassigned radio resources from the information about the unassigned radio resources. The connection control unit selects, from the quality of service information holding unit, one or more combinations of the sets of modulation and coding schemes, and the radio resource amounts that are associated with the quality of service set in a newly incoming call, determines, from the radio resource amounts in the one or more selected combinations, the radio resource amount that is equal to or smaller than the amount of the unassigned radio resources, assigns, to the newly incoming call, the combination that is associated with the determined radio resource amount and the quality of service set in the newly incoming call, reduces the radio resources assigned to the ongoing call without changing the quality of service in a case where every radio resource amount in the one or more selected combinations exceeds the amount of the unassigned radio resources which is held in the radio resource management unit, and assigns, to the newly incoming call, an amount of radio resources released from the ongoing call and modulation and coding schemes that are associated with this released radio resource amount.

According to the aspect of this invention, QoS in a wireless system is guaranteed more securely, and the blocking rate of new calls is lowered.

BRIEF DESCRIPTION OF THE DRAWINGS

The present invention can be appreciated by the description which follows in conjunction with the following figures, wherein:

FIG. 8 is an explanatory diagram of a communication quality management table in accordance with the first embodiment of this invention;

FIG. 9 is an explanatory diagram of a resource management table in accordance with the first embodiment of this invention;

FIG. 11 is an explanatory diagram of a QoS class management table in accordance with the first embodiment of this invention;

FIG. 12 is an explanatory diagram of a QoS-guaranteed traffic management table in accordance with the first embodiment of this invention;

FIG. 18 is an explanatory diagram of the QoS-guaranteed traffic management table in accordance with a second embodiment of this invention;

DETAILED DESCRIPTION OF THE PREFERRED EMBODIMENTS

Figure 1A:
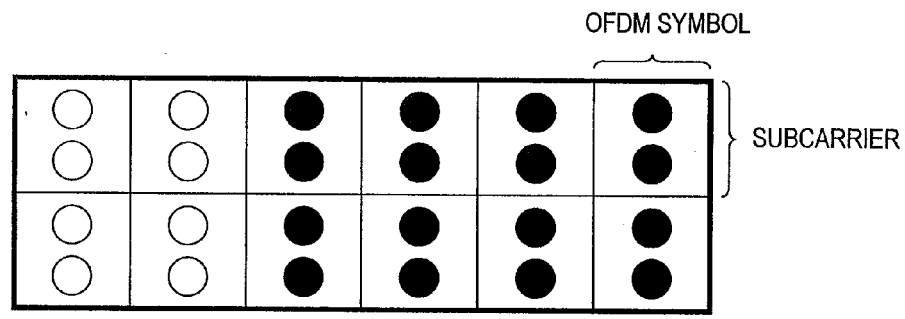
FIG. 1A is an explanatory diagram illustrating a principle of radio resources of QPSK modulation in accordance with an embodiment of this invention.
Figure 1B:
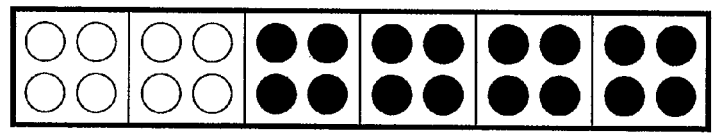
FIG. 1B is an explanatory diagram illustrating a principle of radio resources of 16QAM modulation in accordance with an embodiment of this invention.

FIG. 1A and FIG. 1B are diagrams illustrating a principle of radio resources in this invention.

In sending a single packet, a cellular wireless communication system that uses OFDMA may freely select the amount of radio resources to be used for a single packet and an MCS (coding rate at which error correcting coding is performed on a packet and modulation scheme to be applied).

In this invention, radio resources are frequency and time resources each constituted of a given number of subcarriers and a given number of OFDM symbols. An element constituted of one subcarrier and one OFDM symbol represents one modulation symbol. One modulation symbol corresponds to one radio resource.

A white circle and a black circle of FIG. 1A and FIG. 1B represent a data bit and a redundancy bit, respectively.

To send a packet to a terminal, a base station assigns to the packet radio resources that are constituted of, in the case of FIG. 1A, two subcarriers and six OFDM symbols. The modulation scheme and the coding rate in FIG. 1A are QPSK and ⅓, respectively.

On the other hand, to send a packet to the terminal, the base station assigns to the packet radio resources that are constituted of, in the case of FIG. 1B, one subcarrier and six OFDM symbols. The modulation scheme and the coding rate in FIG. 1B are 16QAM and ⅓, respectively.

Comparing the cases of FIG. 1A and FIG. 1B, the radio resource amount used by the packet of FIG. 1B is half the radio resource amount used by the packet of FIG. 1A. On the other hand, the number of bits transmitted per modulation symbol in FIG. 1B is twice the number of bits transmitted per modulation symbol in FIG. 1A. The number of data bits sent in FIG. 1B is therefore the same as the number of data bits sent in FIG. 1A.

However, the packet of FIG. 1B is inferior to the packet of FIG. 1A in terms of error rate at the same received signal-to-noise ratio (SNR). In other words, a radio environment that sends the packet of FIG. 1B requires a higher received SNR in order to achieve the same error rate as that of the packet of FIG. 1A.

The cases of FIGS. 1A and 1B reach the result by varying the modulation scheme. Alternatively, the coding rate may be varied instead of the modulation scheme to obtain the same result.

This invention utilizes this principle to change the radio resource assignment amount without changing the packet size.

First Embodiment

A first embodiment of this invention is described referring to FIGS. 2 to 17.

Figure 2:
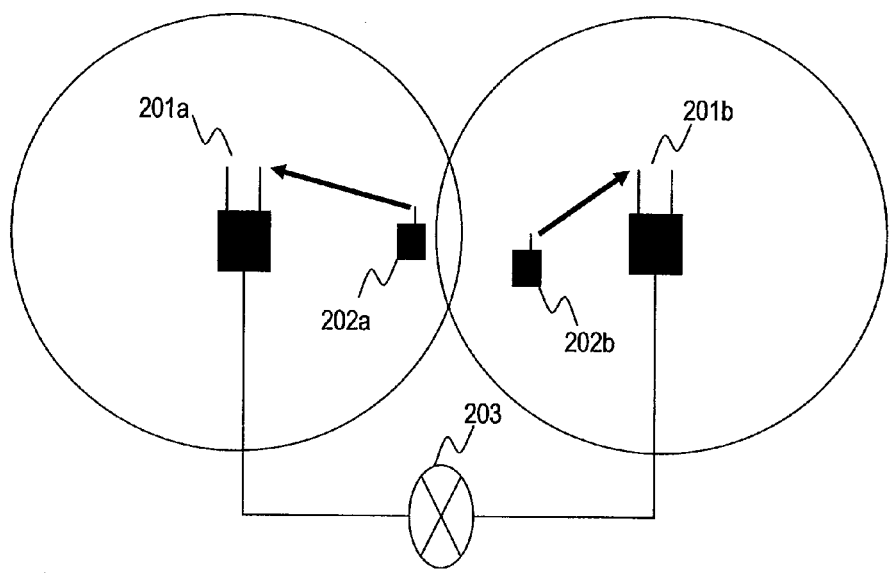
FIG. 2 is a configuration diagram of a cellular wireless communication system in accordance with the first embodiment of this invention.

FIG. 2 is a configuration diagram of a cellular wireless communication system according to the first embodiment of this invention.

The cellular wireless communication system generally includes a plurality of base stations and a plurality of terminals as illustrated in FIG. 2. A base station 201a and a base station 201b are each connected via a wired link to a network 203. A terminal 202a and a terminal 202b are connected via wireless links to the base station 201a and the base station 201b, respectively, to communicate with the network 203.

The base station 201a and the base station 201b have the same configuration. Therefore, the base station 201a is discussed as a representative example in the description given below on the base stations.

In embodiments of this invention, wireless links conform to the specifications of Long Term Evolution (LTE). The specifications of wireless links conforming to LTE are defined in detail in TS 36.211 (v8.4.0) standardized by 3GPP.

Figure 3:
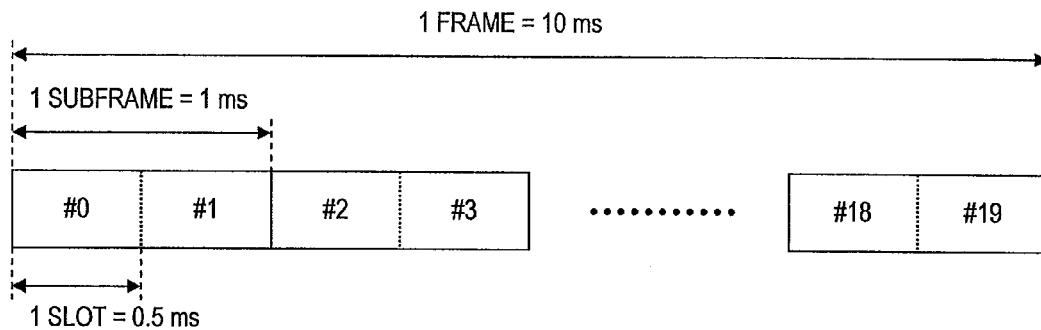
FIG. 3 is a configuration diagram of an LTE radio frame in accordance with the first embodiment of this invention.

FIG. 3 is a configuration diagram of an LTE radio frame according to the first embodiment of this invention.

One LTE radio frame has a duration of 10 ms, and is divided into ten subframes. A packet is sent for every subframe (1 ms). A single subframe is further divided into two slots each having a slot time of 0.5 ms. Frequency hopping is executed on a slot basis. In executing packet transmission once, radio resources are assigned with twelve continuous subcarriers as the minimum unit, and two slots that belong to the same subframe are assigned with the same amount of radio resources.

Figure 4:
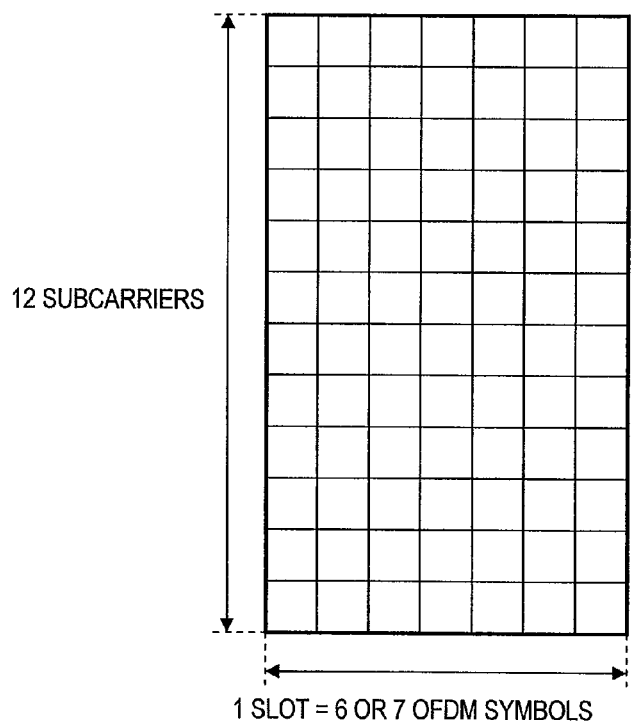
FIG. 4 is a configuration diagram of an LTE resource block in accordance with the first embodiment of this invention.

FIG. 4 is a configuration diagram of an LTE resource block according to the first embodiment of this invention.

In the embodiments of this invention, radio resources constituted of one slot of twelve continuous subcarriers are called a resource block (RB). A single slot consists of six or seven OFDM symbols. The amount of radio resources assigned to each packet transmission is expressed by the number of RBs per slot.

Figure 5:
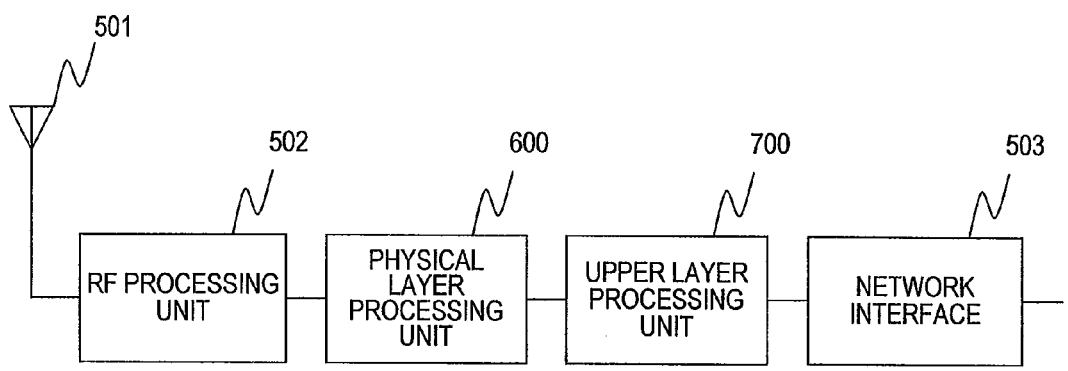
FIG. 5 is a block diagram illustrating a configuration of a base station in accordance with the first embodiment of this invention.

FIG. 5 is a block diagram illustrating a configuration of a base station according to the first embodiment of this invention.

The base station 201a includes an antenna 501, an RF processing unit 502, a physical layer processing unit 600, an upper layer processing unit 700, and a network interface 503.

The RF processing unit 502 is a processing unit that processes radio frequency signals and, for example, has the same configuration as that of an RF processing unit 602 described referring to FIG. 9 of JP 2008-211411 A.

The physical layer processing unit 600 is a processing unit that processes baseband signals in the physical layer.

The upper layer processing unit 700 is a processing unit that processes signals in a second layer (data link layer) and layers above the second layer.

The network interface 503 is an interface that enables the base station 201a to communicate with other devices connected to the network 203.

Figure 6:
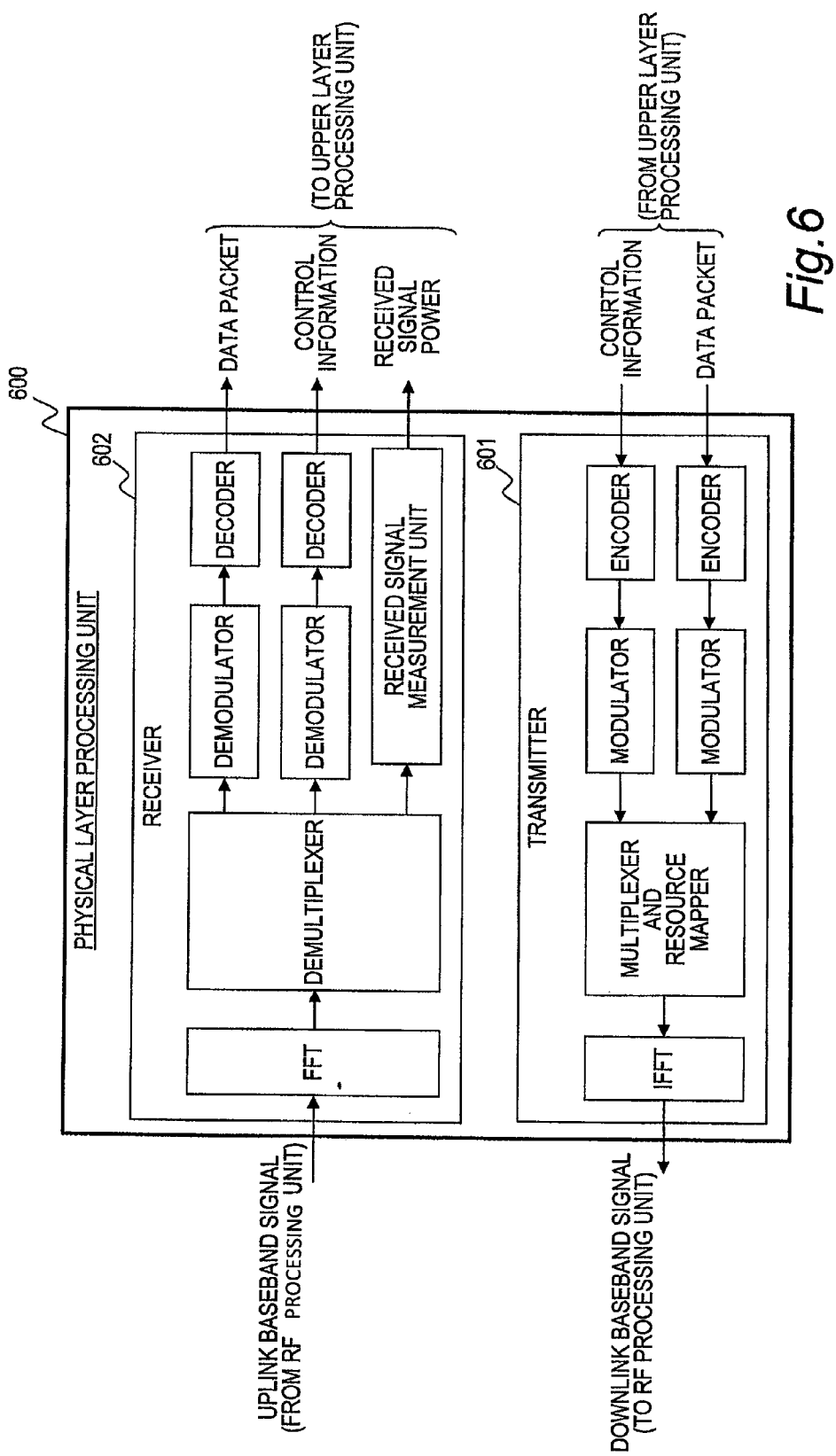
FIG. 6 is a block diagram illustrating a physical layer processing unit in accordance with the first embodiment of this invention.

FIG. 6 is a block diagram illustrating the physical layer processing unit 600 according to the first embodiment of this invention.

The physical layer processing unit 600 includes a transmitter 601 and a receiver 602.

The transmitter 601 performs error correcting coding and modulation on a data packet and control information, which are input from the upper layer processing unit 700, separately, and then maps the two onto physical resources to perform multiplexing. The transmitter 601 next generates a downlink baseband signal by performing IFFT calculation on the multiplexed signal, and outputs the generated signal to the RF processing unit 502. The coding rate and the modulation scheme that are employed in encoding and modulating the data packet and the physical resource onto which the data packet is mapped are determined according to downlink scheduling information, which is notified from the upper layer processing unit 700.

The receiver 602 performs FFT calculation on an uplink baseband signal input from the RF processing unit 502, and then demultiplexes the multiplexed signal into a data packet, control information, and a reference signal. The data packet and the control information each undergo demodulation and error correcting decoding, and are output to the upper layer processing unit 700. The reference signal undergoes received signal power measurement, and the result of the measurement is output to the upper layer processing unit 700 as a piece of control information. A physical resource that is referred to when the data packet is demultiplexed from the multiplexed signal and the modulation scheme and the coding rate that are employed in demodulating and decoding the data packet are determined according to uplink scheduling information, which is notified from the upper layer processing unit 700.

Figure 7:
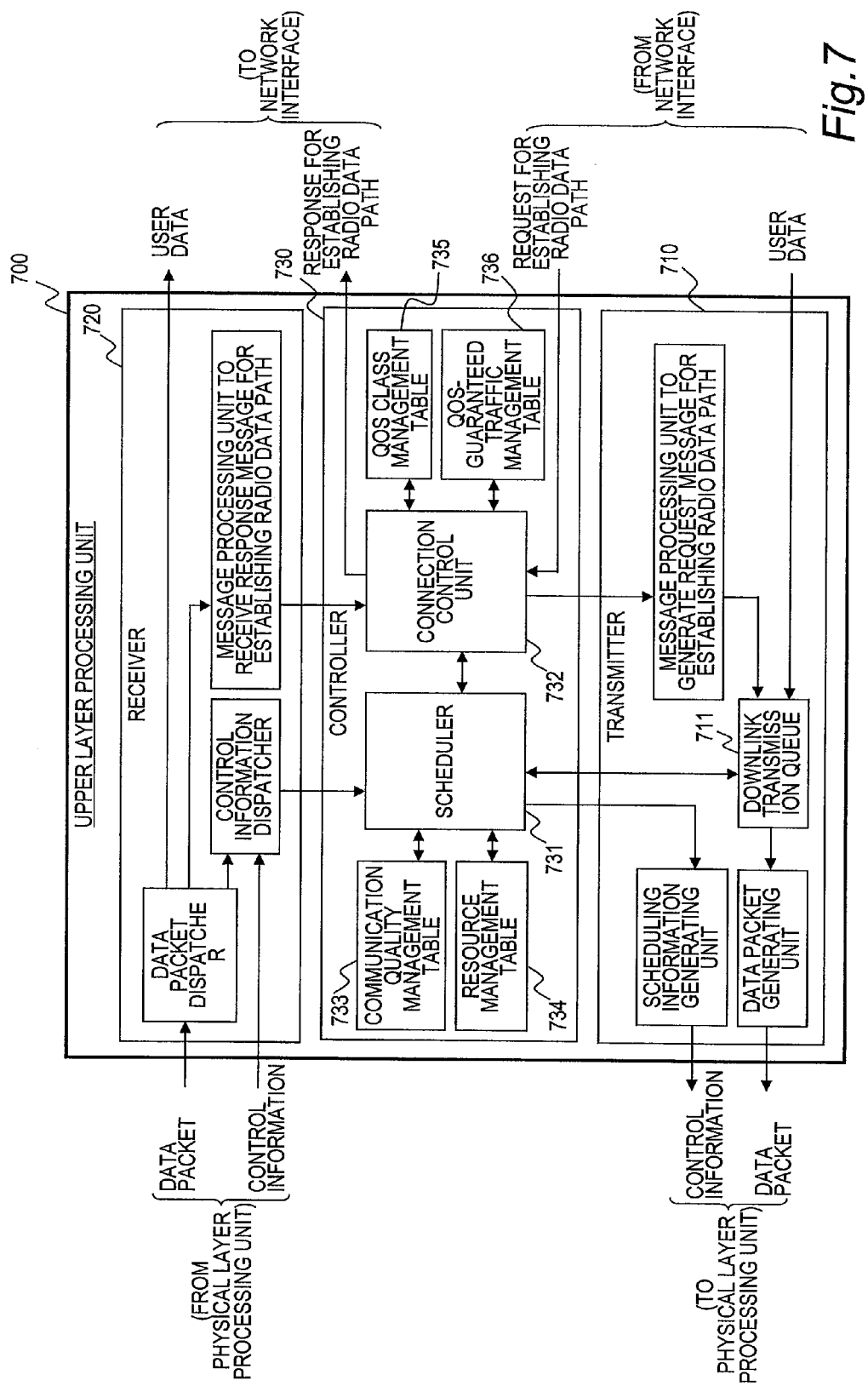
FIG. 7 is a block diagram illustrating a upper layer processing unit in accordance with the first embodiment of this invention.

FIG. 7 is a block diagram illustrating the upper layer processing unit 700 according to the first embodiment of this invention.

The upper layer processing unit 700 includes a transmitter 710, a receiver 720, and a controller 730.

The transmitter 710 stores in a downlink transmission queue 711 downlink user data, which is received from the network 203 via the network interface 503. From the downlink transmission queue 711, the transmitter 710 reads user data as scheduled by a scheduler 731 to generate a data packet. The transmitter 710 also generates various types of control information including uplink scheduling information and downlink scheduling information. The generated data packet and control information are output to the physical layer processing unit 600.

The receiver 720 sorts a data packet input from the physical layer processing unit 600 into user data, which is to be transferred to the network 203, and control information destined to the base station 201a, which has been transmitted by the data packet. The receiver 720 also distributes the control information transmitted by the data packet and control information input from the physical layer processing unit 600 to their respective processing units within the controller 730 which perform various types of control.

The controller 730 includes the scheduler 731 and a connection control unit 732.

The scheduler 731 refers to a group of tables, which are described later. The scheduler 731 is actually a downlink scheduler and an uplink scheduler, which refer to a downlink table group and an uplink table group, respectively. However, differences between the two are not relevant to this invention, and no particular discrimination is made between the two in the following description.

The scheduler 731 is a processing unit that schedules data packet transmission based on the state of the downlink transmission queue 711 or on an uplink buffer status report (BSR), which is notified from the terminal 202a. The scheduling involves assigning radio resources and deciding on an MCS in addition to assigning subframes for data packet transmission. The scheduler 731 also replies with radio resource assignment executability upon reception of an inquiry from the connection control unit 732 and, when there are radio resources available for assignment, reserves radio resources to be assigned. To execute these processing operations, the scheduler 731 refers to a communication quality management table 733 and a resource management table 734.

The communication quality management table 733 is a table that holds information about the reception quality of signals communicated between the base station and terminals. The communication quality management table 733 is referred to and updated by the scheduler 731.

The reception quality of downlink signals is regularly notified from the terminal 202a. The reception quality of uplink signals is calculated based on the received signal power at the base station of the reference signal, which is sent regularly from the terminal 202a.

FIG. 8 is an explanatory diagram of the communication quality management table 733 according to the first embodiment of this invention.

The communication quality management table 733 uses numerical values ranging from 0 to 15 to indicate the communication quality of each terminal for each RB (a number is assigned uniquely to each RB in ascending order of frequency, and hence, for example, 1 and 2 are assigned to the lowest frequency and the second lowest frequency, respectively).

The communication quality value represented in the communication quality management table 733 corresponds to a value observed when the employed MCS is an MCS that makes the frequency utilization efficiency highest of all MCSs where the block error rate in reception is 10% or less. The meaning of the communication quality value is defined in the table 7.2.3-1 of TS 36.213 (v8.4.0), which is standardized by 3GPP.

The resource management table 734 is a table that holds the state of radio resource assignment with respect to a data packet transmission, and is referred to and updated by the scheduler 731.

FIG. 9 is an explanatory diagram of the resource management table 734 according to the first embodiment of this invention.

The resource management table 734 indicates, for each interlace and RB, identification information of a terminal that uses the RB exclusively. A blank cell in the resource management table 734 indicates that the relevant RB is not assigned at the relevant interlace to any terminal (free state). FIG. 9 illustrates the resource management table 734 that is created in the case where the base station resends a data packet with eight subframes as one cycle. One interlace corresponds to one subframe out of the eight subframes.

Figure 10:
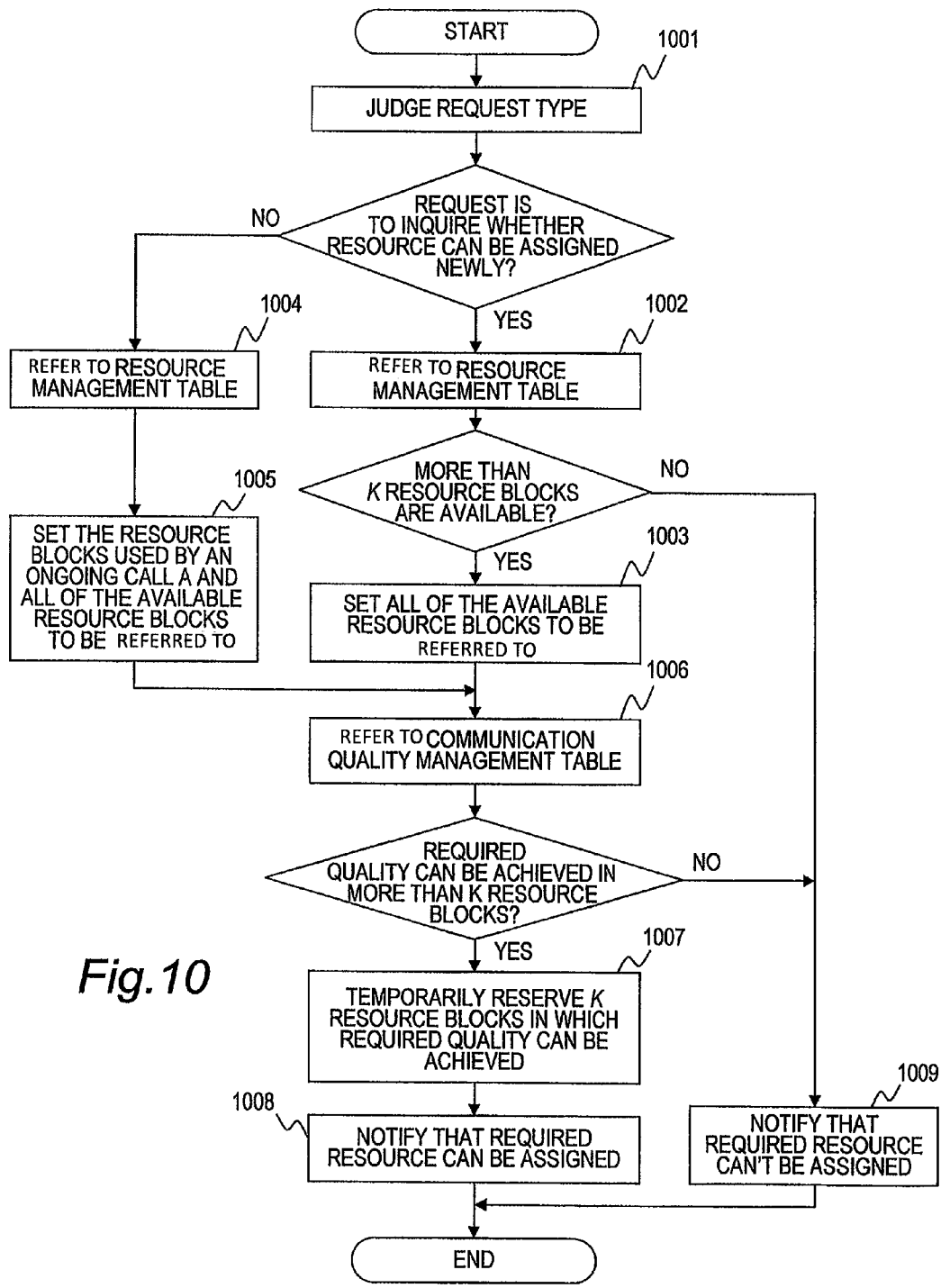
FIG. 10 is a flow chart illustrating resource assignment executability determining operation of the scheduler in accordance with the first embodiment of this invention.

A description is given referring to an operation flow chart of FIG. 10 on reply operation that the scheduler 731 performs in response to a resource assignment executability inquiry from the connection control unit 732.

FIG. 10 is a flow chart illustrating resource assignment executability determining operation of the scheduler 731 according to the first embodiment of this invention.

A resource assignment executability inquiry from the connection control unit 732 is one of a new assignment executability inquiry and a reassignment executability inquiry. Each inquiry contains as an argument the number of RBs requested to be assigned (K RBs), identification information of a call to which resources are to be assigned, and terminal identification information.

Receiving a resource assignment executability inquiry from the connection control unit 732, the scheduler 731 judges whether the received inquiry is a new assignment executability inquiry or a reassignment executability inquiry (Step 1001).

When the received resource assignment executability inquiry is a new assignment executability inquiry, the scheduler 731 refers to the resource management table 734 to judge whether or not there are K or more free RBs (Step 1002).

When it is judged in Step 1002 that there are less than K free RBs, the scheduler 731 judges that assigning the requested amount of radio resources is not possible, sends a "resource assignment inexecutable" notification to the connection control unit 732 as a reply (Step 1009), and ends the processing.

When it is judged in Step 1002 that there are K or more free RBs, the scheduler 731 sets these free RBs as RBs of which the communication quality is referred to (communication quality checked RBs) (Step 1003).

When it is judged in Step 1001 that the resource assignment executability inquiry received from the connection control unit 732 is a reassignment executability inquiry, the scheduler 731 refers to the resource management table 734 (Step 1004) to retrieve free RBs. The scheduler 731 sets the free RBs and RBs that are assigned to a call specified by an argument in the inquiry as communication quality checked RBs (Step 1005).

After Step 1003 or Step 1005 is finished, the scheduler 731 refers to the communication quality management table 733 to judge whether or not the communication quality checked RBs described above include K or more RBs that satisfy a given communication quality between the base station and a terminal specified in the resource assignment executability inquiry (Step 1006). When it is judged in Step 1006 that there are less than K RBs that satisfy the required communication quality, the scheduler 731 judges that assigning the required amount of radio resources is not possible, and proceeds to Step 1009. When there are K or more RBs that satisfy the required communication quality, the scheduler 731 judges that assigning the required amount of radio resources is possible, and temporarily reserves K RBs from among the RBs that satisfy the required communication quality (Step 1007). The scheduler 731 subsequently sends a notification to the effect that radio resource assignment is executable to the connection control unit 732 as a reply (Step 1008), and ends the processing.

The RBs temporarily reserved in Step 1007 are reserved for real for data transmission/reception of the call in question by the scheduler 731, upon instruction from the connection control unit 732 that validates resource reservation. In the case where an instruction that invalidates resource reservation is received from the connection control unit 732, the temporary RB reservation made in Step 1007 is cancelled by the scheduler 731.

The connection control unit 732 responds to a radio data path establishing request for a new call, which is received from the network 203, by attempting to establish a radio data path where requested QoS is guaranteed, and notifies the network 203 of the success or failure of the attempt. When succeeded in establishing a radio data path, the connection control unit 732 gives the scheduler 731 an instruction that validates resource reservation for radio resources temporarily reserved for the establishment of the radio data path.

Details of the operation of the connection control unit 732 are described later.

FIG. 11 is an explanatory diagram of a QoS class management table 735 according to the first embodiment of this invention.

The QoS class management table 735 is a table that defines QoS classes received by the base station 201a, and is referred to by the connection control unit 732. The QoS class management table 735 is set in advance when the system starts to run, and the content thereof is not changed dynamically by other processing units while the system is running.

In FIG. 11, M different QoS classes are defined and numbered from 1 to M in ascending order of packet size.

A packet size and one of N different assignment patterns (combination of an MCS index and the number of RBs) are defined for each QoS class. The N assignment patterns are numbered from 1 to N in descending order of number of RBs.

The MCS index is a number assigned to a combination of a modulation scheme and a transport block size (TBS) number. The meaning of the MCS index is defined in the table 7.1.7.1-1 of TS 36.213 (v8.4.0), which is standardized by 3GPP. The TBS number corresponds to the coding rate. A combination of a TBS number and the number of RBs determines the packet size according to the table 7.1.7.2.1-1 of TS 36.213 (v8.4.0).

FIG. 12 is an explanatory diagram of a QoS-guaranteed traffic management table 736 according to the first embodiment of this invention.

The QoS-guaranteed traffic management table 736 is a table that holds information on a call requiring QoS guarantee, and is referred to and updated by the connection control unit 732.

The QoS-guaranteed traffic management table 736 contains, for each call requiring QoS guarantee that the base station 201a has permitted to access, the identification number of the call (traffic index), a downlink QoS class, a downlink assignment pattern index, a downlink resource compression flag, an uplink QoS class, an uplink assignment pattern index, and an uplink resource compression flag. A resource compression flag is a flag that indicates whether or not resource compression processing described later is to be executed. A resource compression flag having a value "0" means that the resource compression processing has not been executed, and a resource compression flag having a value "1" means that the resource compression processing has been executed.

The QoS-guaranteed traffic management table 736 may be two separate tables, and one of the tables is for uplink traffic indexes and the other is for downlink traffic indexes.

The controller 730 also includes processing units and tables that are for executing other types of control than those described above (for example, transmission power control and synchronization). However, these processing units and tables are not directly related to this invention, and a detailed description thereof is omitted.

Figure 13:
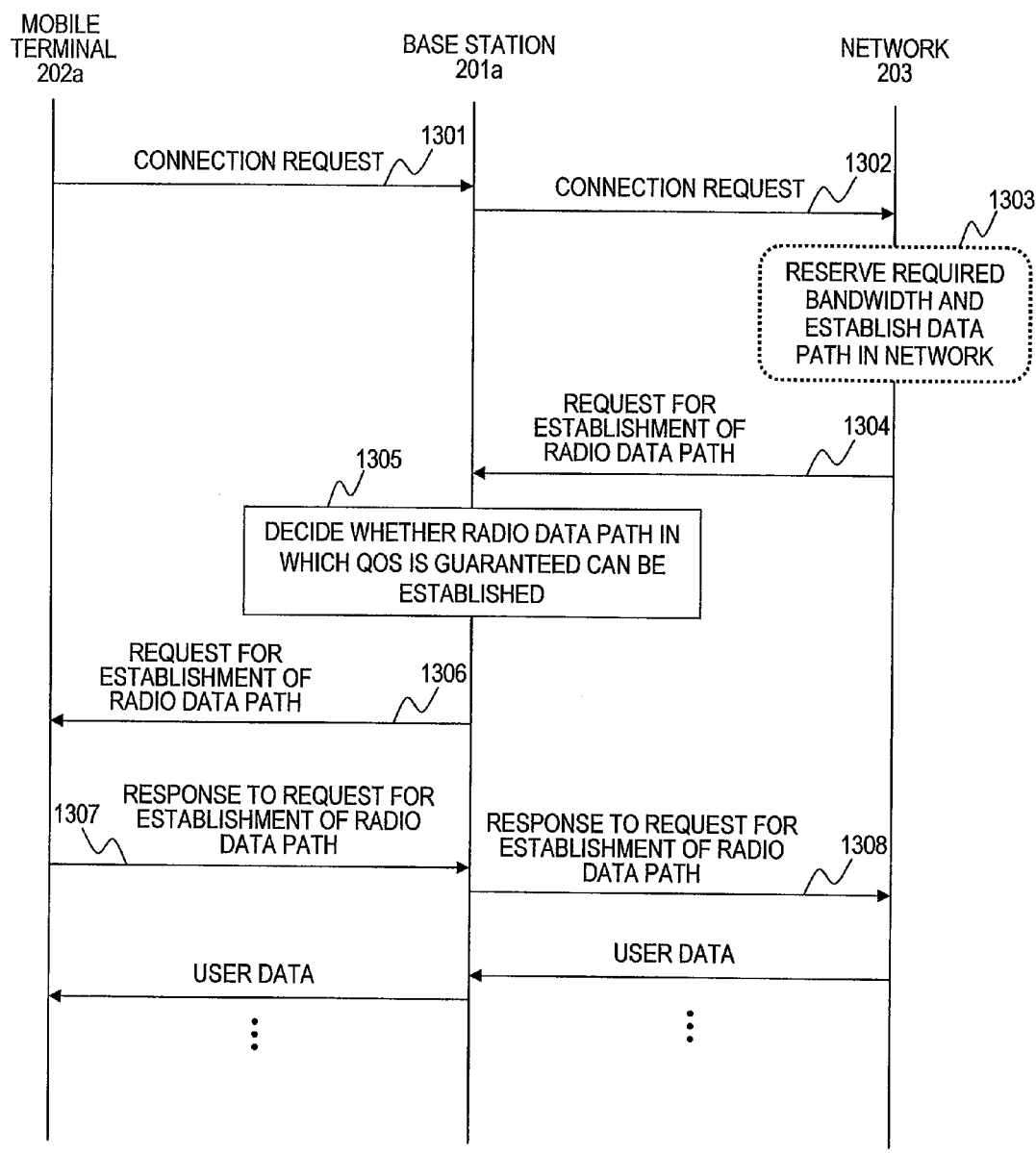
FIG. 13 is a sequence diagram illustrating communication steps that are taken when QoS guarantee is started in accordance with the first embodiment of this invention.

Next, a description is given referring to FIG. 13 on communication steps taken by the base station 201a, the terminal 202a, and the network 203 when a service that needs QoS guarantee is started.

FIG. 13 is a sequence diagram illustrating communication steps that are taken when QoS guarantee is started according to the first embodiment of this invention.

A user requests via the terminal 202a to enable the user to start using a service provided over the network 203 (Step 1301 and Step 1302).

The network 203 ensures network resources necessary for the requested service, and establishes a data path where QoS is guaranteed (Step 1303). Thereafter, the network 203 requests the base station 201a to establish a radio data path where QoS is guaranteed (Step 1304).

The base station 201a decides whether or not the requested radio data path may be established (Step 1305).

When establishing that the requested radio data path is not possible, the base station 201a replies to the network 203 that the radio data path has not been established successfully.

When establishing that the requested radio data path is possible, the base station 201a establishes the radio data path where QoS is guaranteed between the base station 201a and the terminal 202a (Step 1306 and Step 1307). The base station 201a then replies to the network 203 to notify the network 203 whether the radio data path has successfully been established (Step 1308).

When the attempt to establish the radio data path where QoS is guaranteed succeeds in Steps 1306 and 1307, the network 203 starts communication at the requested level of QoS.

When the attempt to establish the radio data path where QoS is guaranteed fails in Steps 1306 and 1307, the network 203 operates according to a policy of the network 203. A common policy that dictates the operation of the network 203 when an attempt to establish a radio data path fails is to refuse access to the base station 201a, or to execute Step 1304 and subsequent steps again at a quality lower than the requested quality. Whichever the policy is, the base station 201a follows an instruction that is sent from the network 203 next.

Figure 14:
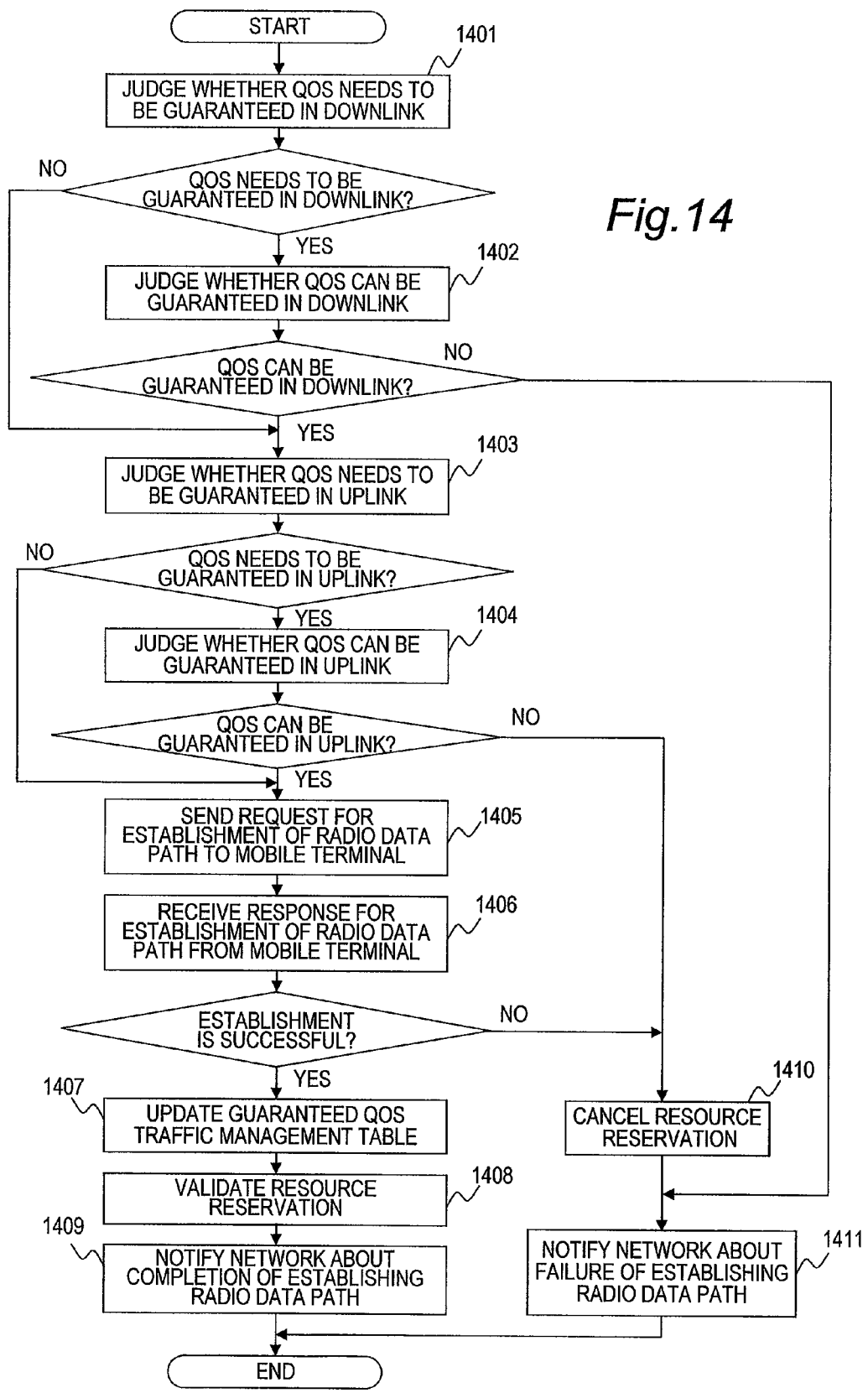
FIG. 14 is a flow chart illustrating the operation of the connection control unit to establish a radio data path in accordance with the first embodiment of this invention.

The series of operation steps from Step 1305 to Step 1308 for establishing a radio data path is described referring to a flow chart of FIG. 14.

FIG. 14 is a flow chart illustrating the operation of the connection control unit 732 to establish a radio data path according to the first embodiment of this invention.

The connection control unit 732 refers to the content of a request for establishment of radio data path (Step) 1304 received from the network 203 to judge whether or not the QoS of the downlink communication needs to be guaranteed (Step 1401). When it is judged as a result that QoS guarantee is necessary, the connection control unit 732 judges whether or not the downlink communication may be guaranteed of QoS (Step 1402). When the QoS of the downlink communication does not need to be guaranteed, on the other hand, the connection control unit 732 proceeds to Step 1403. Information about the necessity/non-necessity of QoS guarantee is contained in the request for establishment of radio data path 1304.

When it is judged in Step 1402 that the downlink communication may not be guaranteed of QoS, the connection control unit 732 sends a message to the effect that establishing the radio data path has not been possible to the network 203 in response to the request for establishment of radio data path 1304 (Step 1411). The connection control unit 732 then ends the processing.

When it is judged in Step 1402 that the downlink communication may be guaranteed of QoS, the connection control unit 732 refers to the content of the request for establishment of radio data path 1304 to judge whether or not the QoS of the uplink communication needs to be guaranteed (Step 1403). When it is judged as a result that the QoS of the uplink communication needs to be guaranteed, the connection control unit 732 judges whether or not the uplink communication may be guaranteed of QoS (Step 1404). When it is judged in Step 1403 that the QoS of the uplink communication does not need to be guaranteed, the connection control unit 732 proceeds to Step 1405.

When it is judged in Step 1404 that the uplink communication may not be guaranteed of QoS, the connection control unit 732 sends an instruction that invalidates resource reservation to the scheduler 731 (Step 1410) and proceeds to Step 1411.

When it is judged in Step 1404 that the uplink communication may be guaranteed of QoS, the connection control unit 732 sends a request for establishment of radio data path (Step) 1306 to the terminal 202a (Step 1405), and receives a response to the request for establishment of radio data path (Step) 1307 from the terminal 202a (Step 1406).

When the response received from the terminal 202a in Step 1406 says that the radio data path has not been established successfully, the connection control unit 732 proceeds to Step 1410.

When the response received from the terminal 202a in Step 1406 says that the radio data path has successfully been established, the connection control unit 732 registers the QoS class and assignment pattern index of the downlink communication as well as the QoS class and assignment pattern index of the uplink communication in the QoS-guaranteed traffic management table 736 (Step 1407). The connection control unit 732 also sends to the scheduler 731 an instruction that validates resource reservation for the relevant new call (Step 1408).

In the case where resource compression processing, which is described later, is executed as a result of the processing of judging whether QoS may be guaranteed in Steps 1402 and 1404, the connection control unit 732 updates the QoS-guaranteed traffic management table 736 in Step 1407 by rewriting the assignment pattern of every existing call that has been a target of the resource compression processing with an assignment pattern that applies after the resource compression, and by setting "1" to the resource compression flag of the existing call. In Step 1408, the connection control unit 732 sends to the scheduler 731 an instruction that validates resource reservation for every existing call that has been a target of the resource compression processing.

Further, the connection control unit 732 sends a response to the request for establishment of radio data path (Step) 1308 to the effect that establishing the radio data path has been finished to the network 203 in response to the request for establishment of radio data path 1304 (Step 1409). The connection control unit 732 then ends the processing.

The processing of judging whether or not QoS may be guaranteed in Step 1402 and Step 1404 is described next referring to an operation flow chart of FIG. 15.

Figure 15:
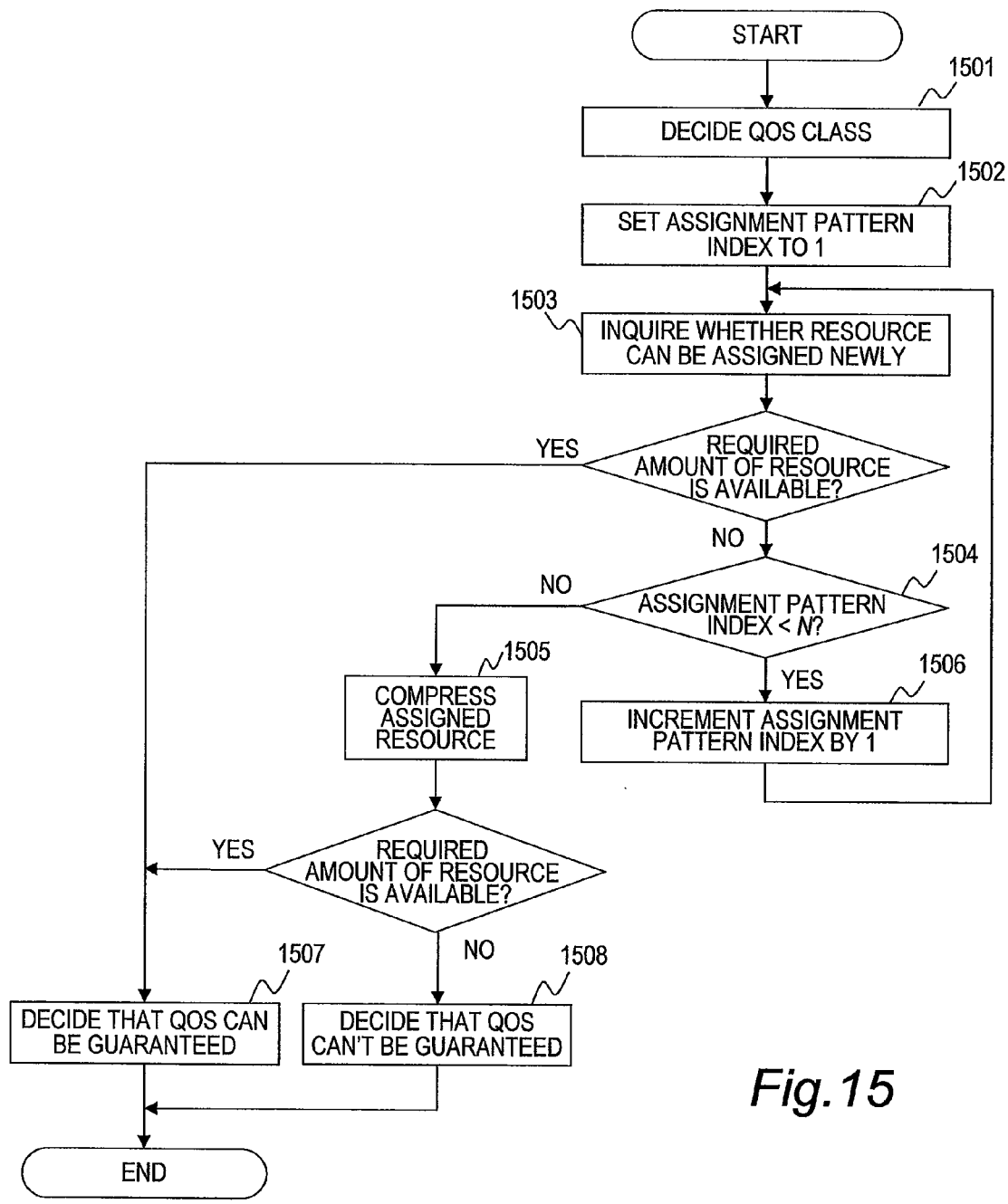
FIG. 15 is a flow chart illustrating processing that is executed by the connection control unit to judge whether guaranteeing QoS is possible in accordance with the first embodiment of this invention.

FIG. 15 is a flow chart illustrating processing that is executed by the connection control unit to judge whether guaranteeing QoS is possible according to the first embodiment of this invention.

The connection control unit 732 calculates a packet size necessary for a data transmission rate requested in the request for establishment of radio data path 1304, and refers to the QoS class management table 735 to decide a QoS class that is associated with the necessary packet size (Step 1501). The connection control unit 732 next sets the assignment pattern index to "1" (Step 1502), and selects the number of RBs that is associated with the decided QoS class and that has an assignment pattern index "1." The connection control unit 732 makes an inquiry to the scheduler 731 about whether new assignment at the selected number of RBs (K RBs) is possible (Step 1503). In the case where the scheduler 731 replies to the inquiry that the assignment is possible, the connection control unit 732 determines that QoS may be guaranteed (Step 1507).

In the case where the scheduler 731 replies to the inquiry of Step 1503 that the assignment is not possible, the connection control unit 732 refers to the assignment pattern index (Step 1504). When the assignment pattern index is smaller than N, the connection control unit 732 increments the assignment pattern index by 1 (Step 1506) and returns to Step 1503. When it is judged in Step 1504 that the assignment pattern index is N, selecting an assignment pattern that is associated with the QoS class decided in Step 1501 is not possible, and the connection control unit 732 therefore compresses radio resources (Step 1505). In the case where Step 1505 results in the successful ensuring of radio resources in an amount necessary for a new call, the connection control unit 732 decides that QoS may be guaranteed (Step 1507). In the case where radio resources may not be ensured in an amount necessary for a new call, the connection control unit 732 decides that QoS guarantee is not possible (Step 1508).

Through the processing described above, the connection control unit 732 guarantees QoS with respect to a new call by changing the MCS and the number of RBs, instead of changing the requested packet size.

The operation of the resource compression processing in Step 1505 is described next referring to an operation flow chart of FIG. 16.

Figure 16:
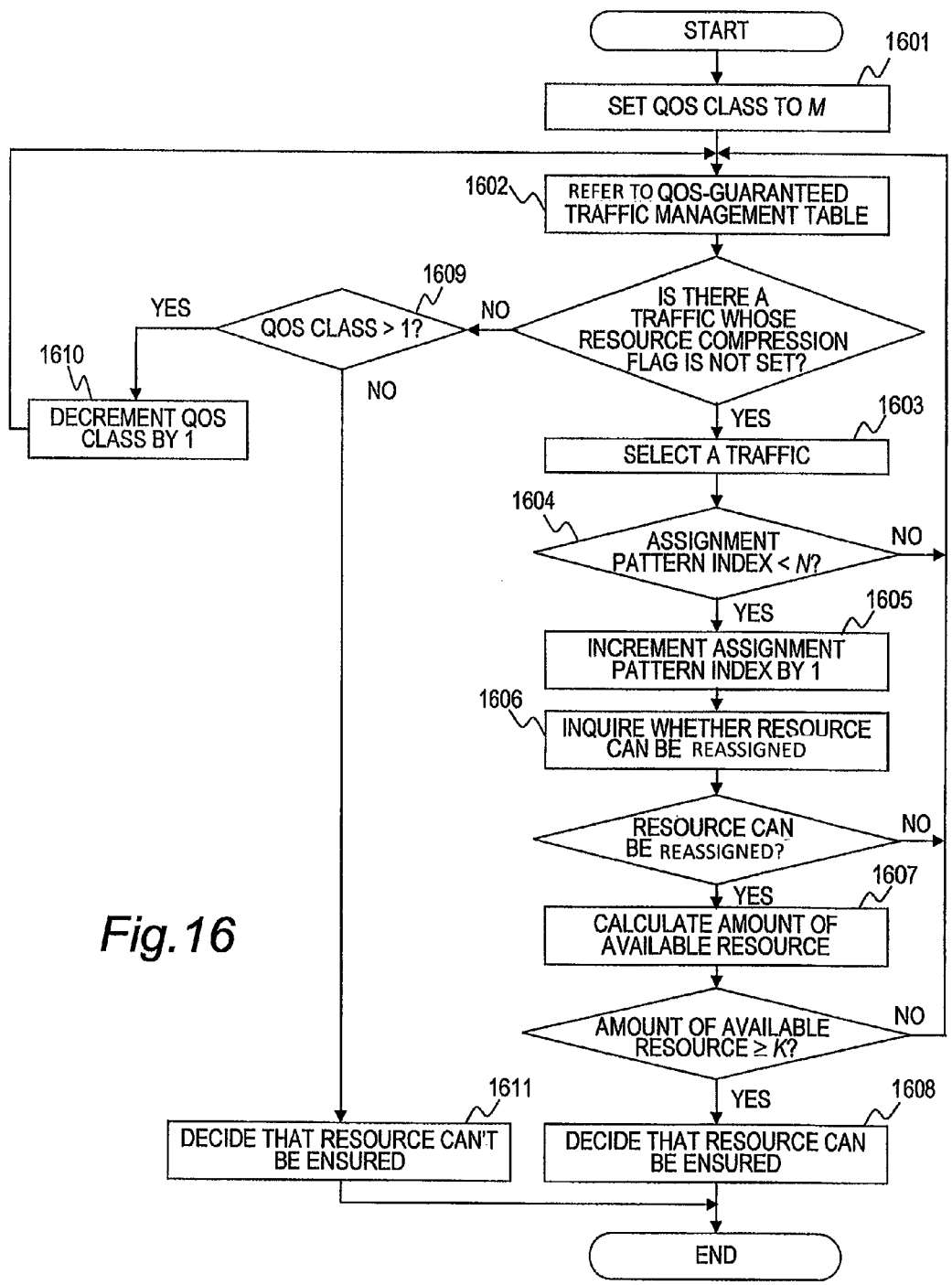
FIG. 16 is a flow chart illustrating the operation of the resource compression processing by the connection control unit in accordance with the first embodiment of this invention.

FIG. 16 is a flow chart illustrating the operation of the resource compression processing by the connection control unit 732 according to the first embodiment of this invention.

The connection control unit 732 selects M for the QoS class number (Step 1601), and refers to the QoS-guaranteed traffic management table 736 to judge whether or not there is an existing call that is associated with this QoS class and that has "0" as the value of its resource compression flag (Step 1602). When at least one existing call that has "0" as the resource compression flag value is found in Step 1602, the connection control unit 732 judges that at least one existing call has not undergone resource compression, and selects one of the existing calls that have "0" as the resource compression flag value (Step 1603).

The connection control unit 732 next judges whether or not the index of an assignment pattern currently applied to the selected existing call (Existing Call A) (assignment pattern index n) is smaller than N (Step 1604). When n=N, in other words, when the number of RBs may not be reduced any more in the QoS class M, the connection control unit 732 returns to Step 1602. When it is judged in Step 1604 that n is smaller than N, the connection control unit 732 selects a new assignment pattern which has an assignment pattern index n'=n+1 (Step 1605). Specifically, the connection control unit 732 selects an assignment pattern that is higher in MCS value and lower in number of RBs as an assignment pattern to be newly assigned to Existing Call A. The number of RBs in the assignment pattern having an assignment pattern index n' is K'.

The connection control unit 732 next sends to the scheduler 731 an inquiry about whether reassignment of K' RBs to Existing Call A is executable (Step 1606). In the case where the scheduler 731 replies that the reassignment is executable as a result, the connection control unit 732 calculates the total number of free RBs remaining after the assignment pattern n' is applied to Existing Call A, and compares the number of free RBs against K, which is the number of RBs necessary for a new call (Step 1607). When it is judged as a result that the total number of free RBs is equal to or larger than K, the connection control unit 732 decides that radio resources have successfully been ensured (Step 1608), and ends the resource compression processing. When it is judged in Step 1607 that the number of free RBs is smaller than K, the connection control unit 732 decides that further resource compression is necessary to ensure enough radio resources, and returns to Step 1602.

When it is judged in Step 1602 that all of the existing calls have undergone resource compression, the connection control unit 732 judges whether or not the QoS class number that is currently selected is larger than 1 (Step 1609). When the current QoS class number is larger than 1, the connection control unit 732 decrements the QoS class number by 1 (Step 1610) and returns to Step 1602. When it is judged in Step 1609 that the current QoS class number is 1, which is the lower limit of the QoS class number, the connection control unit 732 decides that radio resources have not been ensured successfully (Step 1611), and ends the resource compression processing.

Through the processing described above, the connection control unit 732 reduces RBs assigned to existing calls, i.e., releases RBs assigned to ongoing calls, in a situation close to congestion, and assigns the released RBs to a new call. Existing calls that are reduced in number of assigned RBs through the abovementioned processing are selected in descending order of QoS class number. In other words, existing calls that are relatively high in number of RBs are selected first.

In the case where an ongoing call is finished during congestion, the connection control unit 732 redistributes free RBs to be added to the rest of the ongoing calls, thereby increasing the number of RBs of the ongoing calls.

Figure 17:
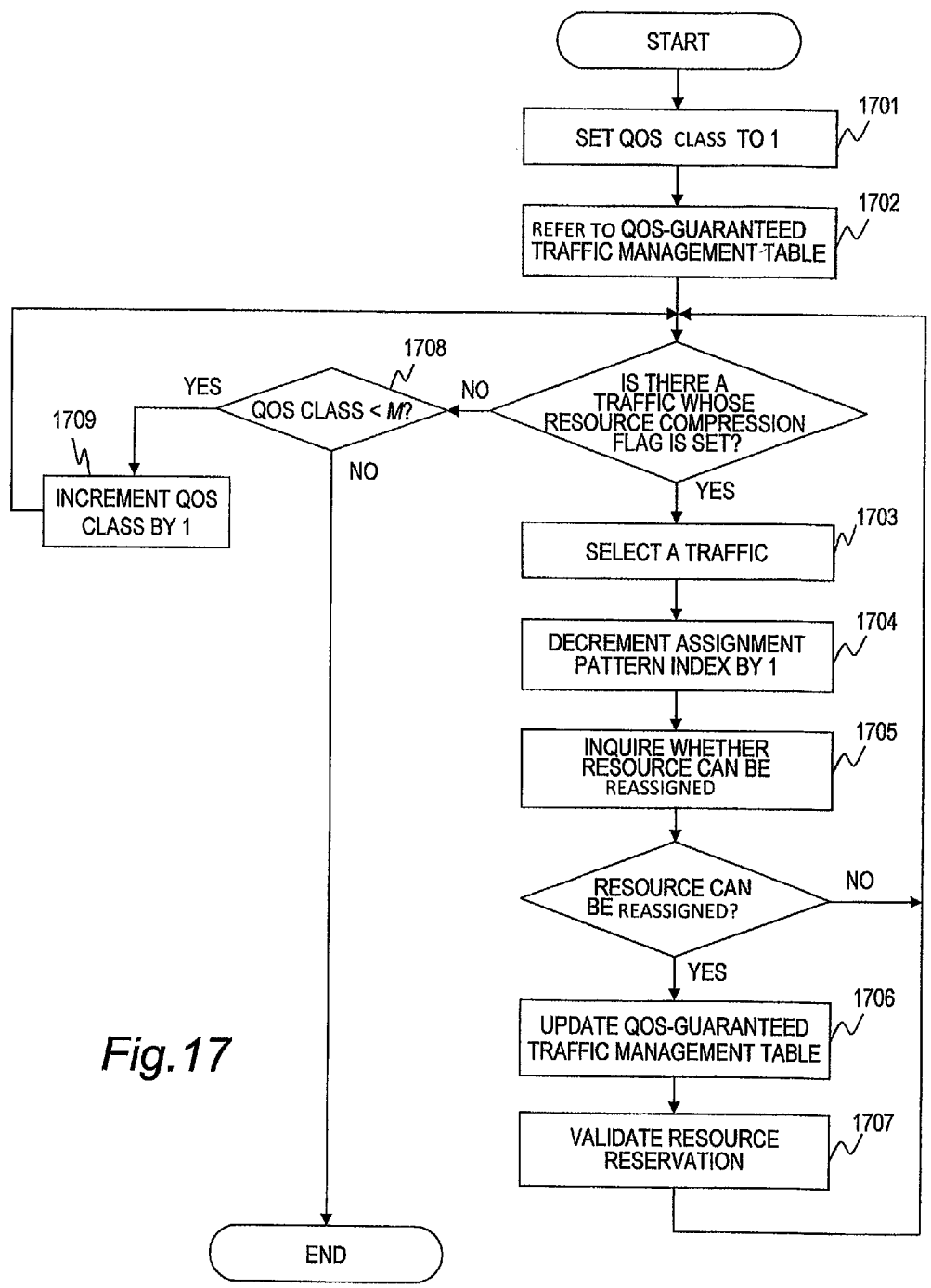
FIG. 17 is a flow chart illustrating processing that is executed by the connection control unit to add radio resources to an existing call in accordance with the first embodiment of this invention.

The processing of adding radio resources is described referring to an operation flow chart of FIG. 17.

FIG. 17 is a flow chart illustrating processing that is executed by the connection control unit 732 to add radio resources to an existing call according to the first embodiment of this invention.

The connection control unit 732 selects 1 as the QoS class number (Step 1701), and refers to the QoS-guaranteed traffic management table 736 to judge whether or not there is an existing call that is associated with this QoS class and that has "1" as the value of its resource compression flag (Step 1702). When at least one existing call that has "1" as the resource compression flag value is found in Step 1702, the connection control unit 732 judges that at least one existing call has undergone resource compression, and selects one of the existing calls that have "1" as the resource compression flag value (Step 1703).

The connection control unit 732 next selects an assignment pattern that has an assignment pattern index n'=n−1 as a new assignment pattern to replace the one currently applied to the selected existing call (Existing Call A) and having an assignment pattern index n (1704). In other words, by selecting a value n=n−1 as the index of a new assignment pattern, the connection control unit 732 selects the number of RBs that is larger than that of the assignment pattern n in the same QoS class. The number of RBs in the assignment pattern having the assignment pattern index n' is K'.

The connection control unit 732 next sends to the scheduler 731a reassignment executability inquiry about whether reassignment of K' RBs to Existing Call A is executable (Step 1705). In the case where the scheduler 731 replies that the reassignment is inexecutable as a result, the connection control unit 732 returns to Step 1702.

In the case where the scheduler 731 replies to the inquiry of Step 1705 that the assignment is executable, the connection control unit 732 updates the QoS-guaranteed traffic management table 736 by changing the assignment pattern index of Existing Call A to n' and setting 0 to the resource compression flag of Existing Call A (Step 1706). The connection control unit 732 also sends to the scheduler 731 an instruction that validates resource reservation (Step 1707), and returns to Step 1702.

When it is judged in Step 1702 that no existing call has "1" as the resource compression flag value, the connection control unit 732 judges that the currently selected QoS class does not include an existing call that has undergone resource compression, and judges whether or not the currently selected QoS class number is smaller than M (Step 1708). When the currently selected QoS class number is smaller than M, the connection control unit 732 increments the QoS class number by 1 (Step 1709) and returns to Step 1702. When it is judged in Step 1708 that the currently selected QoS class number is M, which is the upper limit of the QoS class number, the processing of adding radio resources is ended.

As described above, when sufficient radio resources are available, the connection control unit 732 according to the first embodiment assigns as large an amount of radio resources as possible to a new call within a range in which the requested level of QoS is sufficiently guaranteed, thus setting the order of modulation and the coding rate low. This makes the error rate at the same SNR lower than when the order of modulation and the coding rate are high. Consequently, the base station 201a may guarantee the new call a good quality of service in terms of delay and data transmission rate for the new call more securely.

When radio resources may not be ensured in an amount necessary for QoS guarantee of a new call, the connection control unit 732 reduces radio resources assigned to an existing call by raising the order of modulation and the coding rate, instead of changing the packet size. The base station 201a thus assigns necessary radio resources to the new call while maintaining the data transmission rate of the existing call.

The base station 201a may therefore lower the blocking rate of new calls without disconnecting existing calls or lowering the data transmission rate of existing calls.

Also, because the data transmission rate of existing calls is not changed, the resetting of existing calls in the upper layer is not necessary and the base station 201a may prevent a processing delay from growing.

Second Embodiment

A second embodiment of this invention differs from the first embodiment in the configuration of a QoS-guaranteed traffic management table 736A stored in the base stations 201a and 201b and the operation of the resource compression processing in Step 1505.

FIG. 18 is an explanatory diagram of the QoS-guaranteed traffic management table 736A according to the second embodiment of this invention.

The QoS-guaranteed traffic management table 736A in the second embodiment is obtained by adding to the QoS-guaranteed traffic management table 736 in the first embodiment a "priority for keeping assigned resource" field for downlink traffic and uplink traffic of each call in communication.

The "priority for keeping assigned resource" is an indicator that indicates for each call the degree of insistence to keep the resource amount assigned to the call and not to compress the assigned resources. A larger priority value means a higher degree of insistence to keep assigned radio resources and a greater refusal to resource compression.

Figure 19:
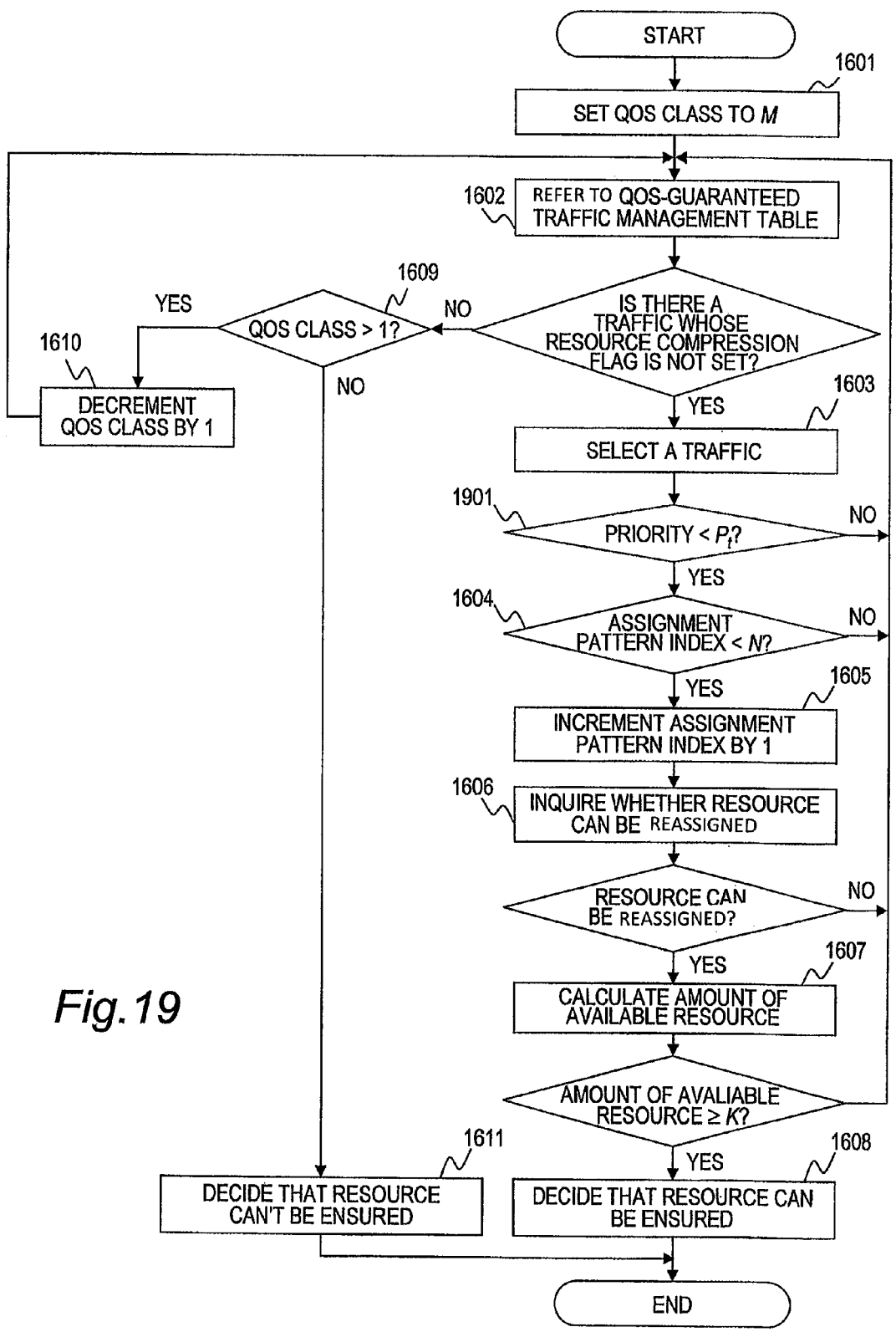
FIG. 19 is a flow chart illustrating the operation of resource compression processing that is executed by the connection control unit in accordance with the second embodiment of this invention.

FIG. 19 is a flow chart illustrating the operation of resource compression processing that is executed by the connection control unit 732 according to the second embodiment of this invention.

In FIG. 19, steps that are the same as those in the resource compression processing of Step 1505 in the first embodiment are denoted by the same numbers that are used in FIG. 16, and a detailed description thereof is omitted here.

The connection control unit 732 in the second embodiment executes Steps 1601 to 1603 in the same manner as described in the first embodiment referring to FIG. 16. Next, the connection control unit 732 compares the priority for keeping assigned resource of the selected existing call (Existing Call A) against a predetermined threshold $P_t$ (Step 1901). When it is judged in Step 1901 that the priority for keeping assigned resource is smaller than $P_t$, the connection control unit 732 judges that the degree of insistence to keep radio resources assigned to Existing Call A is low, and proceeds to Step 1604 to execute Step 1604 and subsequent steps in the same manner as described in the first embodiment referring to FIG. 16. When it is judged in Step 1901 that the priority for keeping assigned resource has a value equal to or larger than $P_t$, the connection control unit 732 judges that the degree of insistence to keep radio resources assigned to Existing Call A is high, and returns to Step 1602 instead of reducing the resource amount that is assigned to Existing Call A. Returning to Step 1602, the connection control unit 732 repeats the processing.

As described above, according to the second embodiment, a priority is set to each existing call, and hence the base station 201a may perform resource compression selectively on existing calls that tolerate deterioration in terms of error rate, delay, and the like.

Third Embodiment

A third embodiment of this invention differs from the second embodiment in the operation of the resource compression processing of Step 1505 performed in the base stations 201a and 201b.

Figure 20:
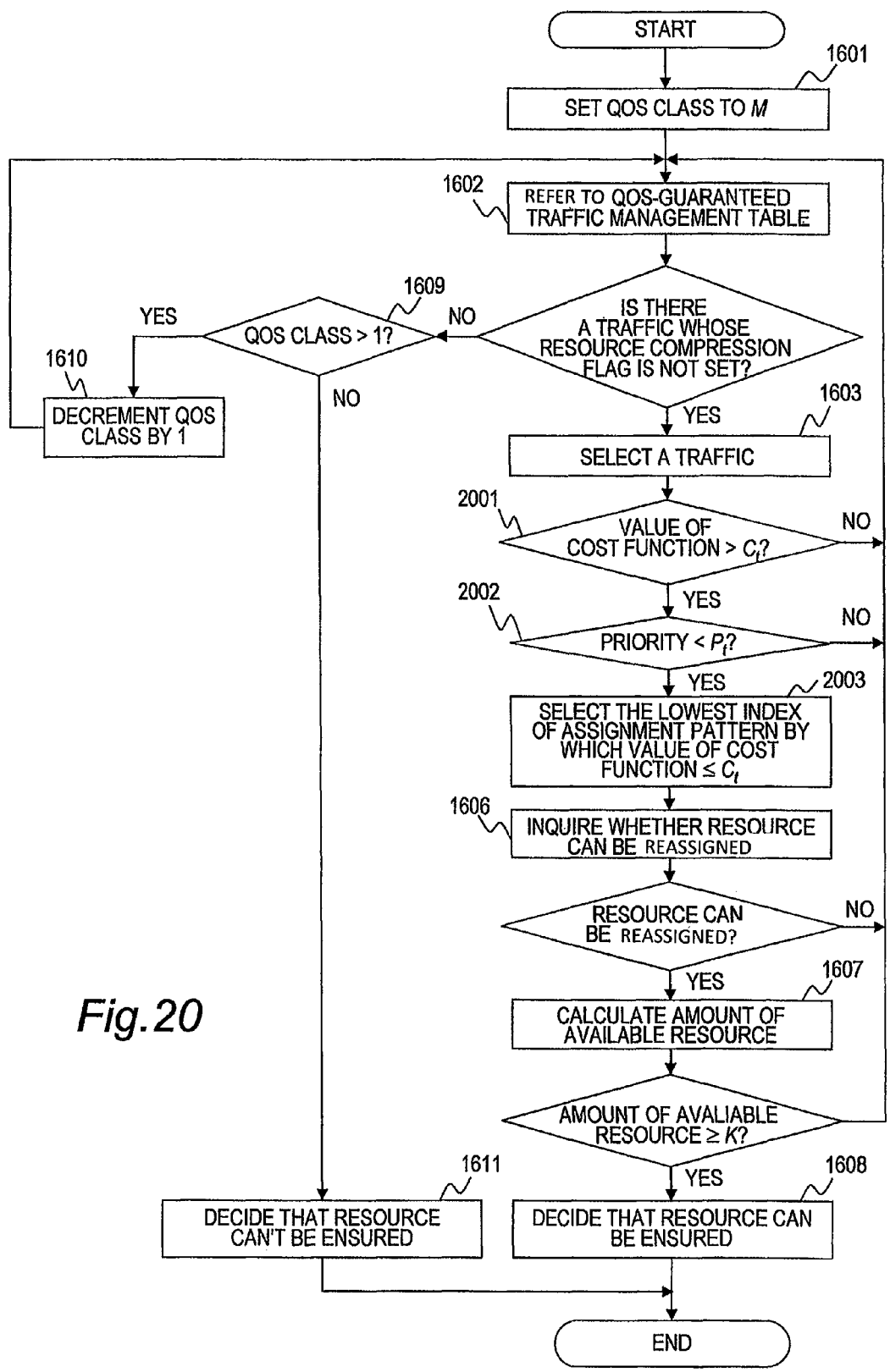
FIG. 20 is a flow chart illustrating the operation of the resource compression processing that is executed by the connection control unit in accordance with a third embodiment of this invention.

FIG. 20 is a flow chart illustrating the operation of the resource compression processing that is executed by the connection control unit 732 according to the third embodiment of this invention.

In FIG. 20, steps that are the same as those in the resource compression processing of Step 1505 in the first embodiment are denoted by the same numbers that are used in FIG. 16, and a detailed description thereof is omitted here.

The connection control unit 732 executes Steps 1601 to 1603 in the same manner as described in the first embodiment referring to FIG. 16. Next, the connection control unit 732 divides the number of RBs that are assigned to the selected existing call (Existing Call A) by the packet size, uses the resultant value as a cost function, and compares the value of the cost function against a predetermined threshold $C_t$ (Step 2001).

When it is judged in Step 2001 that the value of the cost function is larger than $C_t$, the connection control unit 732 judges that the amount of radio resources assigned to Existing Call A is sufficiently large with respect to the packet size, and compares the priority for keeping assigned resource of Existing Call A against the predetermined threshold $P_t$ (Step 2002). When it is judged in Step 2002 that the priority is smaller than $P_t$, the connection control unit 732 judges that the degree of insistence to keep radio resources assigned to Existing Call A is low, and selects from the QoS class management table 735 an assignment pattern to be newly applied to the Existing Call A for resource compression (Step 2003). The new assignment pattern is selected out of assignment patterns that make the value of the cost function equal to or smaller than $C_t$, and is one that has the smallest assignment pattern index among those assignment patterns (assignment pattern number n'). The connection control unit 732 then proceeds to Step 1606 to execute Step 1606 and subsequent steps in the same manner as described in the first embodiment referring to FIG. 16. When it is judged in Step 2002 that the priority for keeping assigned resource has a value equal to or larger than $P_t$, the connection control unit 732 returns to Step 1602 to repeat the processing.

When it is judged in Step 2001 that the value of the cost function is equal to or smaller than $C_t$, the connection control unit 732 judges that the amount of radio resources assigned to Existing Call A is small with respect to the packet size, and returns to Step 1602 to repeat the processing. As mentioned above, when it is judged in Step 2002 that the priority is equal to or larger than $P_t$, too, the connection control unit 732 returns to Step 1602 and repeats the processing.

As described above, according to the third embodiment, the base station 201a compresses radio resources such that the amount of occupied radio resources per data transmission rate is below a given value. Resources may thus be assigned evenly among a plurality of traffic flows.

Also, in the case of the cellular wireless communication system where a small number of terminals are connected, the base station 201a according to the third embodiment guarantees the requested quality of service without fail. In addition, under a situation close to congestion, the base station 201a guarantees QoS in a manner that lowers the blocking rate of new calls, without disconnecting existing calls and without lowering the data transmission rate of existing calls.

While the present invention has been described in detail and pictorially in the accompanying drawings, the present invention is not limited to such detail but covers various obvious modifications and equivalent arrangements, which fall within the purview of the appended claims.

What is claimed is:

1. A base station connected to a wired network and a wireless network to setup a call between the wired network and the wireless network at a predetermined quality of service, comprising:

a connection control unit:

a quality of service information holding unit; and a radio resource management unit, wherein the quality of service information holding unit is configured to:

hold a plurality of combinations of quality of service, a set of modulation and coding schemes, and radio resource amounts in association; and hold association information associating one of the combinations with at least one ongoing call that is in communication, wherein the radio resource management unit is configured to:

hold information about a plurality of radio resources including radio resources that are assigned to each ongoing call and unassigned radio resources; and calculate an amount of the unassigned radio resources from the information about the unassigned radio resources, and wherein the connection control unit is configured to:

select, from the quality of service information holding unit, one or more combinations of the set of modulation and coding schemes and the radio resource amounts that are associated with the quality of service set for a newly incoming call;

determine, from the radio resource amounts associated with the one or more selected combinations, one of the radio resource amounts that is equal to or smaller than the amount of the unassigned radio resources;

assign, to the newly incoming call, the combination of modulation and coding scheme that is associated with the determined radio resource amount and the quality of service set in the newly incoming call;

when every one of the radio resource amounts in the one or more selected combinations exceeds the amount of the unassigned radio resources which is held in the radio resource management unit, reduce the radio resources assigned to the at least one ongoing call without changing the quality of service and assign, to the newly incoming call, an amount of the radio resources released from the ongoing call and the set of modulation and coding scheme that is associated with the amount of the radio resources released from the ongoing call;

reduce the radio resources assigned to the at least one ongoing call in the order of the amount of assigned radio resources of each of the ongoing calls without changing the quality of service;

calculate a packet size of each ongoing call based on the set quality of service;

calculate the amount of radio resources assigned per calculated packet size to each ongoing call; and reduce the radio resources assigned each ongoing call of which the calculated assigned radio resource amount is larger than a predetermined threshold.

2. The base station according to claim 1, wherein the quality of service information holding unit holds a priority of each ongoing call, and wherein the connection control unit reduces the radio resources assigned to the ongoing call whose priority is lower than a threshold specified in advance.

3. The base station according to claim 1, wherein the connection control unit is configured to:

release radio resources assigned to each ongoing call that has finished communication, and assign the released radio resources to other ongoing calls without changing the quality of service of the other ongoing calls.

4. A wireless communication system having a base station that is connected to a wired network and a wireless network, wherein the wireless communication system sets up a call between the wired network and the wireless network at a predetermined quality of service, wherein the wireless communication system comprises a connection control unit, a quality of service information holding unit, and a radio resource management unit, wherein the quality of service information holding unit is configured to:

hold a plurality of combinations of quality of service, a set of modulation and coding schemes, and radio resource amounts in association; and hold association information associating one of the combinations with at least one ongoing call that is in communication, wherein the radio resource management unit is configured to:

hold information about a plurality of radio resources including radio resources that are assigned to each ongoing call and unassigned radio resources; and calculate an amount of the unassigned radio resources from the information about the unassigned radio resources, and wherein the connection control unit is configured to:

select, from the quality of service information holding unit, one or more combinations of the set of modulation and coding schemes, and the radio resource amounts that are associated with the quality of service set for a newly incoming call;

determine, from the radio resource amounts associated with the one or more selected combinations, one of the radio resource amounts that is equal to or smaller than the amount of the unassigned radio resources;

assign, to the newly incoming call, the combination of modulation and coding scheme that is associated with the determined radio resource amount and the quality of service set in the newly incoming call;

when every one of the radio resource amounts in the one or more selected combinations exceeds the amount of the unassigned radio resources which is held in the radio resource management unit, reduce the radio resources assigned to the at least one ongoing call without changing the quality of service and assign, to the newly incoming call, an amount of the radio resources released from the ongoing call and the set of modulation and coding scheme that is associated with the amount of the radio resources released from the ongoing call;

reduce the radio resources assigned to the at least one ongoing call in the order of the amount of assigned radio resources of each of the ongoing calls without changing the quality of service;

calculate a packet size of each ongoing call based on the set quality of service;

calculate the amount of radio resources assigned per calculated packet size to each ongoing call; and reduce the radio resources assigned each ongoing call of which the calculated assigned radio resource amount is larger than a predetermined threshold.

5. The wireless communication system according to claim 4, wherein the quality of service information holding unit holds a priority of each ongoing call, and wherein the connection control unit reduces the radio resources assigned to the ongoing call whose priority is lower than a threshold specified in advance.

6. The wireless communication system according to claim 4, wherein the connection control unit is configured to:

release radio resources assigned to each ongoing call that has finished communication, and assign the released radio resources to other ongoing calls without changing the quality of service of the other ongoing calls.

* * * * *